United States Patent
Allen-Ware et al.

(10) Patent No.: US 9,740,275 B2
(45) Date of Patent: *Aug. 22, 2017

(54) METHOD PERFORMED BY AN ASSOCIATED POWER MANAGEMENT CONTROLLER OF A ZONE BASED ON NODE POWER CONSUMPTION AND PRIORITY DATA FOR EACH OF THE PLURALITY OF ZONES

(71) Applicant: International Business Machines Corporation, Armonk, NY (US)

(72) Inventors: Malcolm S. Allen-Ware, Austin, TX (US); Martha A. Broyles, Austin, TX (US); Timothy G. Hallett, Oronoco, MN (US); James D. Jordan, Round Rock, TX (US); Jordan R. Keuseman, Rochester, MN (US); Benjamin W. Mashak, Rochester, MN (US); Glenn R. Miles, Austin, TX (US); Todd J. Rosedahl, Zumbrota, MN (US); Guillermo J Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/312,064

(22) Filed: Jun. 23, 2014

(65) Prior Publication Data

US 2015/0241946 A1 Aug. 27, 2015

Related U.S. Application Data

(63) Continuation of application No. 14/188,854, filed on Feb. 25, 2014.

(51) Int. Cl.
*G06F 1/26* (2006.01)
*G06F 1/32* (2006.01)

(52) U.S. Cl.
CPC .......... *G06F 1/3296* (2013.01); *G06F 1/3203* (2013.01); *G06F 1/324* (2013.01);
(Continued)

(58) Field of Classification Search
CPC .. G06F 1/3203; G06F 1/3287; Y02B 60/1217
See application file for complete search history.

(56) References Cited

U.S. PATENT DOCUMENTS

| | | |
|---|---|---|
| 6,272,642 B2 | 8/2001 | Pole, II et al. |
| 6,941,480 B1 | 9/2005 | Dai |

(Continued)

OTHER PUBLICATIONS

"HP Power Capping and HP Dynamic Power Capping for Proliant servers", Hewlett-Packard Development Company, L.P., Jan. 2011, 25 pages.

(Continued)

*Primary Examiner* — Mohammed Rehman
*Assistant Examiner* — Gayathri Sampath
(74) *Attorney, Agent, or Firm* — DeLizio Law, PLLC

(57) ABSTRACT

It is determined that a current node power consumption for a node is greater than a node power cap that defines a limit of power consumption for the node. Responsive to the current node power consumption being greater than the node power cap and until the current node power consumption is less than the node power cap, power reduction operations are performed. The power reduction operations comprise determining a power management zone of a plurality of power management zones having a lowest priority among the power management zones and having a power cap greater than a minimum power cap for the power management zone. The power reduction operations further comprise setting the power cap for the power management zone to a value less than a prior value assigned as the power cap for the power management zone.

7 Claims, 4 Drawing Sheets

(52) U.S. Cl.
CPC .......... *G06F 1/3206* (2013.01); *G06F 1/3287* (2013.01); *Y02B 60/1217* (2013.01); *Y02B 60/1285* (2013.01)

(56) References Cited

U.S. PATENT DOCUMENTS

| | | | |
|---|---|---|---|
| 7,310,737 | B2 | 12/2007 | Patel et al. |
| 8,140,868 | B2 | 3/2012 | Felter et al. |
| 2005/0125703 | A1* | 6/2005 | Lefurgy ................. G06F 1/3203 713/320 |
| 2007/0245161 | A1* | 10/2007 | Shaw .................... G06F 1/3203 713/300 |
| 2008/0222435 | A1* | 9/2008 | Bolan ................... G06F 1/3203 713/310 |
| 2009/0125737 | A1* | 5/2009 | Brey ..................... G06F 1/3203 713/322 |
| 2010/0162006 | A1 | 6/2010 | Therien et al. |
| 2010/0205469 | A1* | 8/2010 | McCarthy ............. G06F 9/5061 713/324 |
| 2012/0239216 | A1 | 9/2012 | Kulathu et al. |
| 2013/0061064 | A1 | 3/2013 | Ananthakrishnan et al. |
| 2013/0073882 | A1* | 3/2013 | Inbaraj .................. G06F 1/3206 713/320 |
| 2013/0332753 | A1 | 12/2013 | Varma et al. |
| 2014/0089699 | A1 | 3/2014 | O'Connor et al. |
| 2014/0181545 | A1 | 6/2014 | Shrall et al. |
| 2014/0215254 | A1 | 7/2014 | Mandava et al. |
| 2015/0006925 | A1 | 1/2015 | Branover et al. |
| 2015/0241943 | A1 | 8/2015 | Allen-Ware et al. |
| 2015/0241944 | A1 | 8/2015 | Allen-Ware et al. |
| 2015/0241947 | A1 | 8/2015 | Allen-Ware et al. |

OTHER PUBLICATIONS

"IBM EnergyScale for POWER7 Processor-Based Systems", Apr. 2011, 1 page.

Almoosa, et al., "A Power Capping Controller for Multicore Processors", CERCS Tech Report GIT-CERCS-11-07, 2007, pp. 1-6.

Bartolini, et al., "Thermal and Energy management of High-Performance Multicores: Distributed and Self Calibrating Model-Predictive Controller", Jan. 2013, 15 pages.

Broyles, et al., "IBM EnergyScale for POWER7 Processor-Based Systems", Nov. 2007, 1-66 pages.

Felter, et al., "A Performance-Conserving Approach for Reducing Peak Power Consumption in Server Systems", ICS'05, Jun. 20-22, 2005, pp. 1-10.

Hanson, et al., "Processor-Memory Power Shifting for Multi-Core Systems", International Business Machines, Jun. 9, 2012, pp. 1-7.

Ioannou, et al., "Phase-Based Application-Driven Hierarchical Power Management on the Single-chip Cloud Computer", IEEE publication, 2011, pp. 131-142.

Ma, et al., "PGCapping: Exploiting Power Gating for Power Capping and Core Lifetime Balancing in CMPs", PACT'12, Sep. 19-23, 2012, 2012, pp. 1-10.

Madan, et al., "Guarded Power Gating in a Multi-Core Setting", 2012, 14 pages.

Rotem, et al., "Power management architecture of the 2nd generation Intel® Core™ microarchitecture, formerly codenamed Sandy Bridge", Aug. 2011, 33 pages.

"U.S. Appl. No. 14/188,974 Office Action", Oct. 7, 2015, 14 pages.

"U.S. Appl. No. 14/312,086 Office Action", Oct. 9, 2015, 13 pages.

"U.S. Appl. No. 14/188,854 Office Action", Dec. 24, 2015, 19 pages.

"U.S. Appl. No. 14/188,974 FinalOffice Action", Apr. 27, 2016, 14 pages.

"U.S. Appl. No. 14/312,086 Final Office Action", Apr. 21, 2016, 18 pages.

"U.S. Appl. No. 14/312,086 Office Action", Sep. 9, 2016, 13 pages.

"U.S. Appl. No. 14/188,854 Final Office Action", Jul. 15, 2016, 15 pages.

"U.S. Appl. No. 14/188,854 Office Action", Dec. 16, 2016, 14 pages.

* cited by examiner

METHOD PERFORMED BY AN ASSOCIATED POWER MANAGEMENT CONTROLLER OF A ZONE BASED ON NODE POWER CONSUMPTION AND PRIORITY DATA FOR EACH OF THE PLURALITY OF ZONES

RELATED APPLICATIONS

This application is a continuation application that claims the benefit of U.S. of America patent application Ser. No. 14/188,854 filed on Feb. 25, 2014.

BACKGROUND

Embodiments of the inventive subject matter generally relate to the field of computing system power management, and, more particularly, to distributed power management of processor and memory systems.

Power consumption is an important factor in computing system design for reasons as diverse as maximizing hardware efficiency, increasing computing density and reducing capital costs. Much effort has been spent in reducing the amount of power consumed by a computing system. In fact, many computing systems include processors and hardware dedicated to power management. Some implementations can include centralized hardware, such as a single dedicated processor, that performs the power management operations. Some implementations include distributed power management hardware, allowing simpler power management hardware to control a subset of the system components, resulting in more responsive power management, greater efficiency, etc.

SUMMARY

Embodiments generally include a method comprising determining that a current node power consumption for a node is greater than a node power cap that defines a limit of power consumption for the node. The node comprises a plurality of power management zones and each of the plurality of power management zones has a power cap that defines a limit of power consumption for the power management zone. In response to the current node power consumption being greater than the node power cap and until the current node power consumption is less than the node power cap, power reduction operations are performed. The power reduction operations comprise determining a power management zone of the plurality of power management zones having a lowest priority among the plurality of power management zones and having a power cap greater than a minimum power cap for the power management zone. The power management operations further comprise setting the power cap for the power management zone of the plurality of power management zones to a value less than a prior value assigned as the power cap for the power management zone of the plurality of power management zones.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
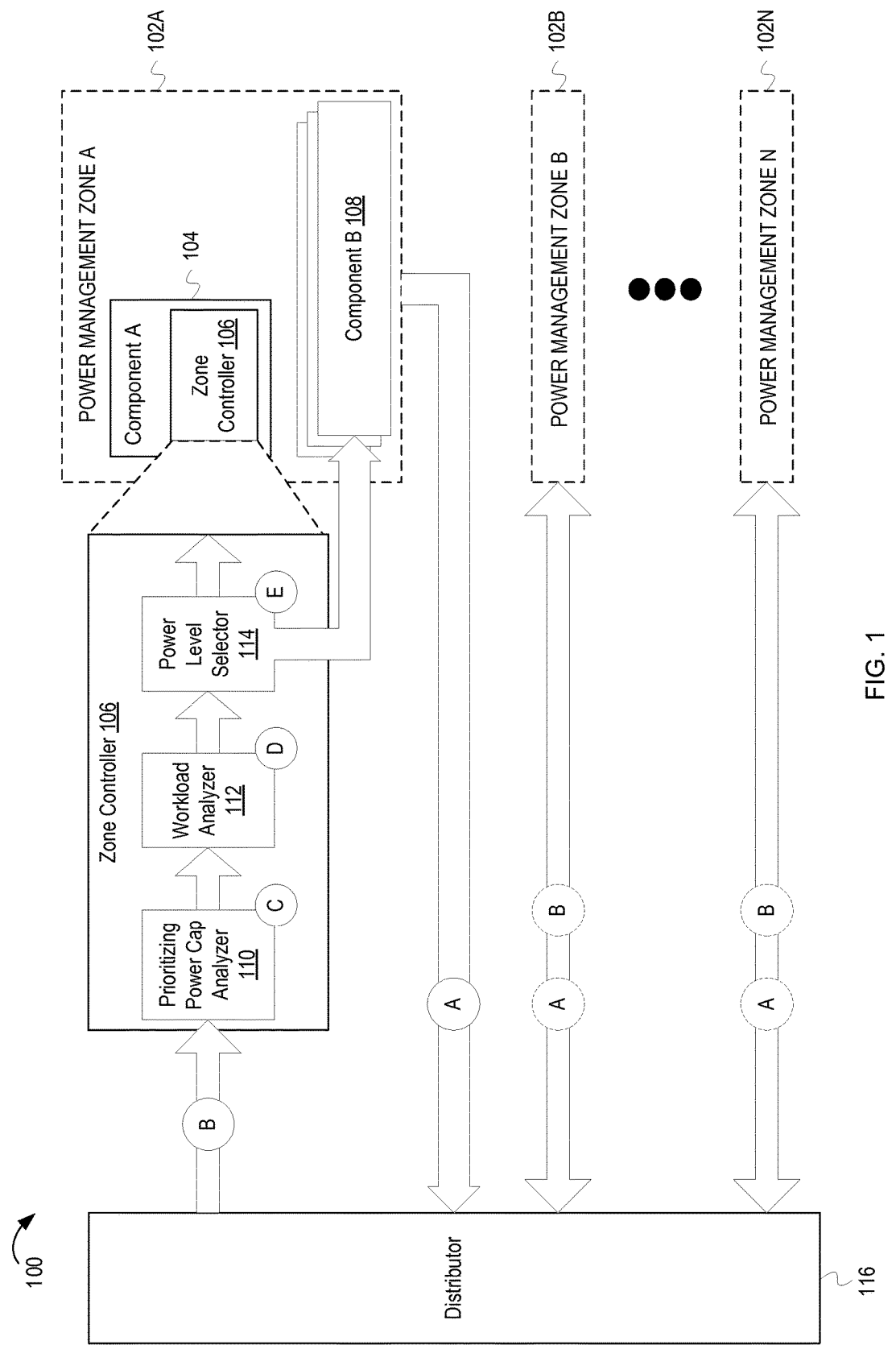
FIG. 1 depicts a distributed power management system with a prioritizing power cap analyzer and a workload analyzer.

The description that follows includes exemplary systems, methods, techniques, instruction sequences and computer program products that embody techniques of the present inventive subject matter. However, it is understood that the described embodiments may be practiced without these specific details. For instance, although examples refer to processors and memory as example components, components can be any computing system component that includes, directly or indirectly, power consumption management functionality. In other instances, well-known instruction instances, protocols, structures and techniques have not been shown in detail in order not to obfuscate the description.

Terminology

For the following descriptions, a "node" includes a group of computing system components. Examples of a node include a server, a rack server, a board with multiple microprocessors, a blade server, a multi-core processor, etc. Examples of components include a processor, a memory module, an input/output hub controller, a processor core, core memory, etc. Some components can be nodes as well. For example, consider a server with two multi-core processors. The server is a node comprising the two multi-core processors, which are components. The multi-core processors are also nodes, each comprising multiple processor cores, which are components. Each processor core can be viewed as being a component of the server node as well.

A "power management zone" (hereinafter "zone") is a collection of components that share the same power management controller (hereinafter "controller"). For example, a zone can include a processor and memory associated with the processor. Zones can be nested. For example, each processor core might be a zone within a larger zone that includes the processor and memory associated with the processor. While implementations can vary greatly, the descriptions below will use zones that include a single processor and memory associated with the processor as examples zones.

A controller can be implemented as any combination of hardware, software, or firmware. The term "controller" is merely used to describe the component or set of components that are responsible for implementing the power management functionality and not to create a distinction between a "controller" and a "processor". In other words, while the terms "controller" and "processor" are used in the descriptions to describe separate components, a controller can be a processor and vice versa. Further, the controller can be implemented using hardware, software, or firmware that implements other functionality in addition to the power management functionality.

A "performance state" is a concept that describes the performance level of a processor or processor core. The performance states (commonly referred to as "Pstates") can be enumerated as $P_{-m}, \ldots, P_{-1}, P_0, P_1, \ldots, P_n$. In general, the lower the performance state, the lower the processor frequency and processor voltage, and thus, the lower the performance of the computing system. Although each performance state corresponds to a certain frequency, the specific frequencies for a given state are implementation specific. For example, performance state $P_n$ can correspond to the maximum processor frequency. Thus, performance state $P_n$ for a 2.5 gigahertz processor corresponds to 2.5 gigahertz, whereas performance state $P_n$ for a three gigahertz processor corresponds to three gigahertz. The scaling of frequency and voltage between performance states can also differ between implementations, even if the maximum processor frequency is the same. For example, assume two computing systems have the same maximum processor frequency and define the same number of performance states. A performance state change in one implementation can correspond to a frequency change of one hundred megahertz, while a performance state change in the other implementation can correspond to a frequency change of two hundred megahertz. Further, different implementations can enumerate performance states differently. For example, some implementations might not include negative performance states (e.g., performance states are only enumerated as $P_0, P_1, \ldots, P_n$), some implementations might not include positive performance states (e.g., performance states are only enumerated as $P_{-m}, \ldots, P_{-1}, P_0$), some implementations might define performance states such that the highest performance state corresponds to the lowest performance of the computing system, etc. For the purposes of the discussion below, the performance states will be defined as $P_0, \ldots, P_9$, with $P_0$ corresponding to the lowest computing system performance and $P_9$ corresponding to the highest computing system performance.

Because processor frequency and voltage correspond to power consumption, performance states can act as a simple proxy for communicating what level of performance/power consumption a particular processor or processor core is operating at. Performance states can apply to other hardware as well. For example, performance state $P_0$ and $P_1$ can correspond to particular refresh rates of a memory module. The descriptions below will assume that power consumption levels are communicated using performance states, although other techniques (such as communicating wattage directly) can be used.

Overview

Generally, computing systems have limits on the amount of power they can consume, referred to as "power caps". For example, a data center is generally designed to allow for a particular maximum amount of power to be drawn by all systems in the data center. This power cap can be divided among the various structures in the data center. For example, each rack can have its own power cap and each computing system in a rack can have a power cap, where each power cap is a subset of the next power cap in the hierarchy. While the power caps can be divided unevenly (e.g., one computing system in a rack can have a higher power cap than another) and the power caps can change dynamically, the total amount of power used by the computing systems in a particular rack generally cannot exceed the rack power cap.

The power caps can funnel down to the computing system components as well. For example, a particular power outlet for a computing system in a rack might have a maximum rating of sixty amperes ("amps"), limiting the amount of current that can be drawn by the computing system and thus limiting the total amount of power that can be consumed. The power cap on the computing system can then be split among the internal components. The power consumption of the internal components is typically managed by the computing system's power management system.

Often times, power management systems are centralized—that is, a central controller manages the power supplied to each component of the system. Centralized power management can be effective in controlling power consumption of the computing system, but can also be inefficient. Because the central controller manages power allocation for each component, the central controller is heavily occupied with managing power consumption for the multiple components of the computing system. In computing systems where power allocation is modified frequently, power management uses resources computing the power allocations for the components and incurs communication overhead for communicating the power allocations throughout the computing system.

Distributing control and management of component power consumption allows for scalability in a complex computing system with a multitude of components, as well as reducing processing overhead. The components are divided into zones. Information about the power consumption of the zones in a computing system can be collected and distributed to controllers for each of the zones. This distribution of computing system wide power consumption information provides each controller with a node-level view of power consumption.

By distributing the information to individual controllers, the workload of calculating power caps for the zones is spread among the individual controllers. Each controller only calculates the power cap for the associated zone, allowing each controller to be less complex than a centralized controller. By reducing controller complexity, the controllers can be more efficient and smaller, thus allowing their placement closer to the components being controlled (e.g., directly on the processor die). Increasing the efficiency of the controllers and placing them near the components allows for quicker reactions to changing conditions, thus increasing performance and decreasing power consumption.

To facilitate calculation of the power caps of the zone components, the power management system can include a distributor. The distributor collates and distributes the node power cap and node power consumption to the individual controllers. The distributor can determine the node power consumption by retrieving and summing the power consumption of each zone.

The individual controllers implement a set of operations that allow each controller to calculate an updated power cap without communicating with the other controllers. One technique that can be used to determine the updated power cap is by maintaining proportionality among the zones. For example, consider a computing system with two zones, where one of the zones uses sixty percent of the available power and the other zone uses forty percent of the available power. If the power cap increases or decreases, each controller determines what percentage of the current power consumption the associated zone consumes. Each controller then increases or decreases the zone power cap in the same proportion. For example, assume the node power cap is 1000 watts and the current power consumption is 900 watts. In the aforementioned two zone node, the first zone uses 540 watts (sixty percent of the current power consumption) and the second zone uses 360 watts (forty percent of the current power consumption). If the power cap subsequently increases to 1100 watts, the zone power caps increase proportionally to their power consumption. Thus, the first zone's power cap increases by sixty watts (sixty percent of the power cap increase) and the second zone's power cap increases by forty watts (forty percent of the power cap increase).

Such an implementation, however, results in the updated zone power caps being tied to the initial conditions present when the zone power caps are updated. Consider a scenario in which the first zone is running a high priority thread while the second zone is running a low priority thread. If the power cap is changed, each zone adjusts its power cap as above. However, the low priority thread might be less sensitive to power cap changes. In other words, the low priority thread may not benefit from increased performance. Thus, allotting any increase in the power cap to the second zone is inefficient, as the first zone can benefit from the increase in the power cap while the second zone cannot. Similarly, lowering the power cap to the high priority thread may result in a larger performance decrease than lowering the power cap to the low priority thread.

Even in such an implementation, the power management system may correct itself after a few updates. For example, if the power cap is increased for both zones, the second zone, running the low priority thread, might not choose to consume more power in response to the increased power cap. The first zone, running the high priority thread, on the other hand, might consume all additional power available to it. This results in the first zone using a greater proportion of power, and thus given a greater proportion of the power cap increases. A similar scenario presents itself in the context of lowering the power caps. However, this delayed response is inefficient and does not fully correct the disparity. In other words, zones that do not utilize power cap increases are given smaller increases, but are still given increases that may not be utilized.

A distributed power management system can be implemented to remedy such a result by utilizing a set of priority-based operations. In such an implementation, each zone is assigned a priority. When the power cap is updated, the controller determines how to adjust the power cap based on the priority of the zones. For example, assume, in the previous example, that the first zone is assigned a high priority and the second zone is assigned a low priority (coinciding with the priority of the running thread, in this instance). If the node power cap decreases, the controller lowers the second zone's power cap prior to lowering the first zone's power cap. Thus, the high priority thread in the second zone will maintain performance until the first zone's power cap is lowered to a particular threshold.

A related issue occurs when the controller determines power caps for the components within a zone. The differing tasks may result in differing loads on the components within a zone. For example, some tasks may result in a greater load on memory while other tasks result in a greater load on a processor. When the characteristics of the tasks being performed in a zone changes, adjusting the power consumption of the components proportional to usage can result in inefficiencies, similar to proportional adjustment of the zone power caps.

A distributed power management system can be implemented to adjust component power consumption based on the characteristics of past, current, or prospective zone workloads. For example, a controller can determine whether a current workload is processor-intensive or memory-intensive. The controller can then adjust the power consumption accordingly. In other words, if the workload is processor-intensive, the controller can lower the power cap of the memory and increase the power cap of the processor. If the workload is memory-intensive, the controller can lower the power cap of the processor and increase the power cap of the memory.

Distributed Power Management System with Performance and Power Boundaries Example Illustrations FIG. 1 depicts a distributed power management system with a prioritizing power cap analyzer and a workload analyzer. A distributed power management system 100 includes power management zone A 102A through power management zone N 102N. Power management zone (hereinafter "zone") A 102A includes component A 104 and component B 108. Component A 104 includes zone controller (hereinafter "controller") 106. Controller 106 includes a prioritizing power cap analyzer (hereinafter "power cap analyzer") 110, workload analyzer 112, and power level selector 114. The distributed power management system 100 also includes a distributor 116. Each zone includes a zone controller (not depicted) similar to the controller 106.

Component A 104 and component B 108 can be any type of component that includes, directly or indirectly, the ability to modify the power consumption of the component. For example, component A 104 can be a processor and component B 108 can be memory. Components that do not include the ability to modify power consumption directly may be associated with additional components that facilitate the ability to modify the power consumption. For example, a component that does not include an integrated voltage regulator may be coupled with an external voltage regulator, allowing the voltage of the component to be modified. In some implementations, the controller 106 can be independent of other components, instead of integrated with a component as depicted in FIG. 1.

All zones, including zone B 102B through zone N 102N can be configured similarly to zone A 102A or configured differently. For example, some zones may include different components or a different quantity of a particular component (such as more or less memory). Further, the components within the zones can function differently. For example, the controller 106 can be configured to receive global settings and distribute them to controllers in the other zones. In other words, one or more of the controllers can function as the distributor 116, instead of the distributor 116 being a separate entity. Similarly, in some implementations, the controller 106 and controllers in other zones communicate directly or through a communication network instead of utilizing the distributor 116.

At stage A, the distributor 116 receives power consumption data from one or more of the power management zones. Using the controller 106 as a representative controller, the distributor 116 can read the data from the controller 106 or the controller 106 can send the data to the distributor 116. The data transfer can occur at regular intervals or irregular intervals. For example, instead of the distributor 116 reading the data from the controller 106 every 250 microseconds, the controller 106 can send the data to the distributor 116 whenever the data changes. The distributor 116 can communicate with the different zones simultaneously or asynchronously. For example, the distributor 116 may read data from the zones at the same time or one zone at a time. In some implementations, the distributor 116 can communicate with components in zone A 102A other than the controller 106.

The data received from the controller 106 is not limited to power consumption data. The data can also include information such as the current state of the zones, characteristics of the processes within the zones, and/or measurements and statistical information. For example, the data can include the current power level of various components within each zone, temperature data, assigned priorities, etc. In other words, the data can include any type of data that can be used by the other controllers to set the power levels. Data indicating priority for each zone can be stored in the respective zone (such as in the controller for the zone) or stored at the distributor 116. If priority data is stored local to the zones, the distributor 116 receives the priority data as well. Further, priority data can be implicit. For example, the priority of a particular zone might be determined based on the how much of the power available to zone is being consumed. In other words, a zone that is using all power available to the zone could have a higher priority than a zone using seventy-five percent of the power available to the zone, etc.

Zone priorities can be set in a variety of ways. For example, the zone priorities can be configured by a user, such as an administrator. The zone priority might be set as part of the computing system boot process and stored in persistent memory, allowing the zone priority configuration to persist even after the computing system has been shut down. Zone priorities might remain static during the operation of the computing system, or might be changed, depending on the implementation. Further, implicitly determined zone priorities can be subsequently stored as explicit values. For example, the priority of a particular zone might be determined based on how much power available to the zone is being consumed, as described above. However, instead of making the priority determination when the priority data is used, the priority determination might be made at other times and then saved as an explicit value.

After receiving the power consumption data from the controller 106, the distributor 116 can calculate the total power consumption by summing the power consumption data from all controllers. In some implementations, the power consumption data received from the controller 106 is broken down by components and not just a single value, in which the power consumption of the individual components is summed. In some implementations, the controllers calculate the total power consumption. Further, the node power consumption can include the power consumed by other components that are not part of the distributed power management system 100, referred to as "background power". Further, the distributor 116 can perform other operations in addition to the collection of data, such as data validation, error correcting, etc.

At stage B, the distributor 116 distributes the data to the controllers in each zone. The distributor 116 can distribute the data to all of the controllers at once or to one controller at a time. The distributor 116 can write the data to the controllers or the controllers can read the data from the distributor 116. For example, the distributor 116 can send an indication to the controller 106 that the data is available and, in response, the controller 106 can read the data from the distributor 116. Additional data can be distributed as well, such as global information. For example, all controllers rely on the node power cap to calculate the zone power caps. Thus, the distributor 116 can distribute the node power cap to the controllers.

At stage C, the power cap analyzer 110 uses the data received from the distributor 116 at stage B to determine the power cap for zone A 102A. The power cap analyzer 110 can also use additional data, such as zone-specific data (workload information, temperature data, etc.) to determine the power cap for zone A 102A. The specific analysis performed by the power cap analyzer 110 can vary between implementations based on the data available to the power cap analyzer 110, the components/configuration of zone A 102A, etc. Further, although depicted as occurring after stage B, the analysis performed at stage C can be performed at any time, such as when conditions local to zone A 102A change.

The power cap analyzer 110 first determines whether the node power cap has increased or decreased. Although some implementations may include the distributor 116 distributing data to the controller 106 even if the data has not changed from a previous distribution, the discussion herein will assume that if the data does not change, no changes are made to the component settings. After determining whether the node power cap has increased or decreased, the power cap analyzer 110 determines whether the power cap for zone A 102A should be changed.

In the case that the node power cap has decreased and the node power consumption is still below the node power cap, changing the power caps can be optional. In other words, the zone power cap can be decreased when, if ever, the node power consumption exceeds the node power cap. This allows the zones to maximize performance until the node power consumption actually surpasses the node power cap. Consider an example of a node with two zones, a 1000 watt node power cap and a 500 watt zone power cap for each zone. Further assume that both zones are idling and each draws 100 watts. Consider a scenario in which the node power cap drops to 800 watts. The controller for each zone could determine that the zone power cap should be lowered to 400 watts. Now assume that the first zone becomes active and begins running a high priority load, maxing out the power cap for the first zone. If the zone power caps were lowered to 400 watts, the performance of the first zone would be limited to a level associated with a maximum power consumption of 400 watts. However, if the zone power caps were not lowered in response to the lower node power cap, the first zone would be limited to the performance level associated with a 500 watt power cap. Neither scenario results in the node power cap being exceeded, while the second scenario allows for greater performance. Because the second zone is still idled (only drawing 100 watts), the two scenarios result in node power consumption of 500 watts and 600 watts, respectively, both of which are well within the node power cap. Thus, preemptively lowering the zone power caps can produce inefficiencies. While preemptively lowering the zone power caps may provide for a safer operating environment, scenarios in which node power consumption exceeds the node power cap are generally taken into account during the design of the node and related hardware. However, in some implementations, if the sum of the zone power caps exceeds the node power cap by a certain amount or percentage, the zone power caps can be lowered accordingly, as described below.

In the case in which the node power cap has decreased and the node power consumption exceeds the lowered node power cap, the power cap analyzer 110 determines whether zones with a lower priority than zone A 102A have a power level that is at or below a particular threshold. For example, the power consumption/performance level of a particular zone can be communicated using performance states. As described above, a particular performance state can be defined as representing a minimum performance level before the zone components are idled ($P_0$ for this discussion). Thus, the power cap analyzer 110 would iterate through the data associated with the other zones. If one or more other zones have a lower priority and a performance state greater than $P_0$, the power cap analyzer 110 can maintain the power cap for zone A 102A, allowing the lower priority zones to lower their power cap. If zone A 102A has the lowest priority, the power cap analyzer 110 lowers the performance state of zone A 102A. The power cap analyzer 110 can lower the performance state incrementally or can determine the number of performance states that the power cap analyzer 110 should lower zone A 102A by in order to reduce the node power consumption to below the node power cap. If zone A 102A and one or more zones have the same priority and the priority is the lowest of all zones, all zones with the lowest priority can lower their performance state.

It may be the case that the lower priority zones cannot lower their power consumption enough to lower the node power consumption to below the node power cap. In some implementations, the power cap analyzer 110 does not explicitly handle this case. For example, if the power cap analyzer 110 performs the analysis at regular intervals, the power cap analyzer 110 can simply keep performing the analysis until no additional lower priority zones can lower their zone power cap, thus forcing the power cap analyzer 110 to lower its zone power cap. In some implementations, the power cap analyzer 110 determines, based on the performance states (i.e., power consumption) of the lower priority zones, whether the lower priority zones can cover the excess power consumption. If not, the power cap analyzer 110 can lower the zone power cap immediately.

If the performance state of zone A 102A is already at the minimum level, the power cap analyzer 110 does nothing.

In the case that the node power cap has increased, the power cap analyzer 110 increases the power cap for zone A 102A. The zone power cap can be increased based on the priority of the zone, increased proportionally based on the current power consumption, etc.

At stage D, the workload analyzer 112 determines characteristics of zone A's workload. The workload analyzer 112 can use a variety of data to determine the characteristics of the workload. For example, the workload can be associated with static metadata that indicates various characteristics, such as metadata that indicates whether the workload has a greater impact on component A 104 or component B 108. Zone A 102A can maintain statistics about the workload, such as how frequently memory is accessed. A large number of memory accesses can indicate that the workload is memory-intensive, for example. The workload analyzer 112 can also look at the percentage of the component power caps used by the respective components. For example, if component A's power consumption has reached its power cap but component B's power consumption is under its power cap, the workload analyzer 112 can assume that the workload causes an increased load on component A 104. Further, the workload analyzer 112 is not limited to the current workload. The workload analyzer 112 can use historical data for past workloads or receive data associated with workloads that are scheduled to be run but are not currently running Once the workload analyzer 112 determines the characteristics of the workload, the workload analyzer 112 determines how to adjust the power caps of component A 104 and component B 108. For example, if the workload analyzer 112 determines that the workload puts an increased load on component A 104, the workload analyzer 112 might increase the power cap for component A 104 but not for component B 108. In some instances, the workload analyzer 112 might increase the power caps of both components an equal amount or an amount proportional to the amount of power consumed by each individual component. The workload analyzer 112 can also take into account the interactions between the components. For example, if component B's power cap is too low, the performance of component B 108 may result in the appearance that the workload increases the load on component B 108 more than component A 104. For example, assume component A 104 is a processor and component B 108 is memory. In such a case, the processor might be waiting for data to load from memory. Thus, while the processor might not be consuming all of the available power, once the data is loaded, the usage could spike. As such, instead of allocating all additional power to the memory, the workload analyzer 112 could allocate some power to the memory and some to the processor. How each specific scenario is handled can vary between implementations, as workloads typical to a particular implementation might exhibit specific characteristics. For example, testing and analysis might show that the workloads on a network server exhibit certain characteristics in response to changing power caps, while workloads on a desktop used for graphic design exhibits different characteristics. Thus, different implementations can be designed to adjust the power caps differently.

At stage E, the power level selector 114 determines what power level the components should be set at. The prior analysis was mostly concerned with power caps, which specify the power level that the entity governed by the power cap should not exceed. However, not all components will necessarily consume all the power available to the components. In other words, the power consumption of a component will not always track the power cap. For example, a four zone node power cap might be 1000 watts, but all zones of the node may be idling and thus only pulling 100 watts. Even if the total power consumption is 400 watts, the node power cap is still 1000 watts. Thus, the power level selector 114 takes into account requests for other power levels while not allowing the power consumption to go above the zone power cap. In other words, the power cap(s) determined by the power cap analyzer 110 and workload analyzer 112 might be only one of several different factors that determine the actual power consumption of a particular component.

Figure 2:
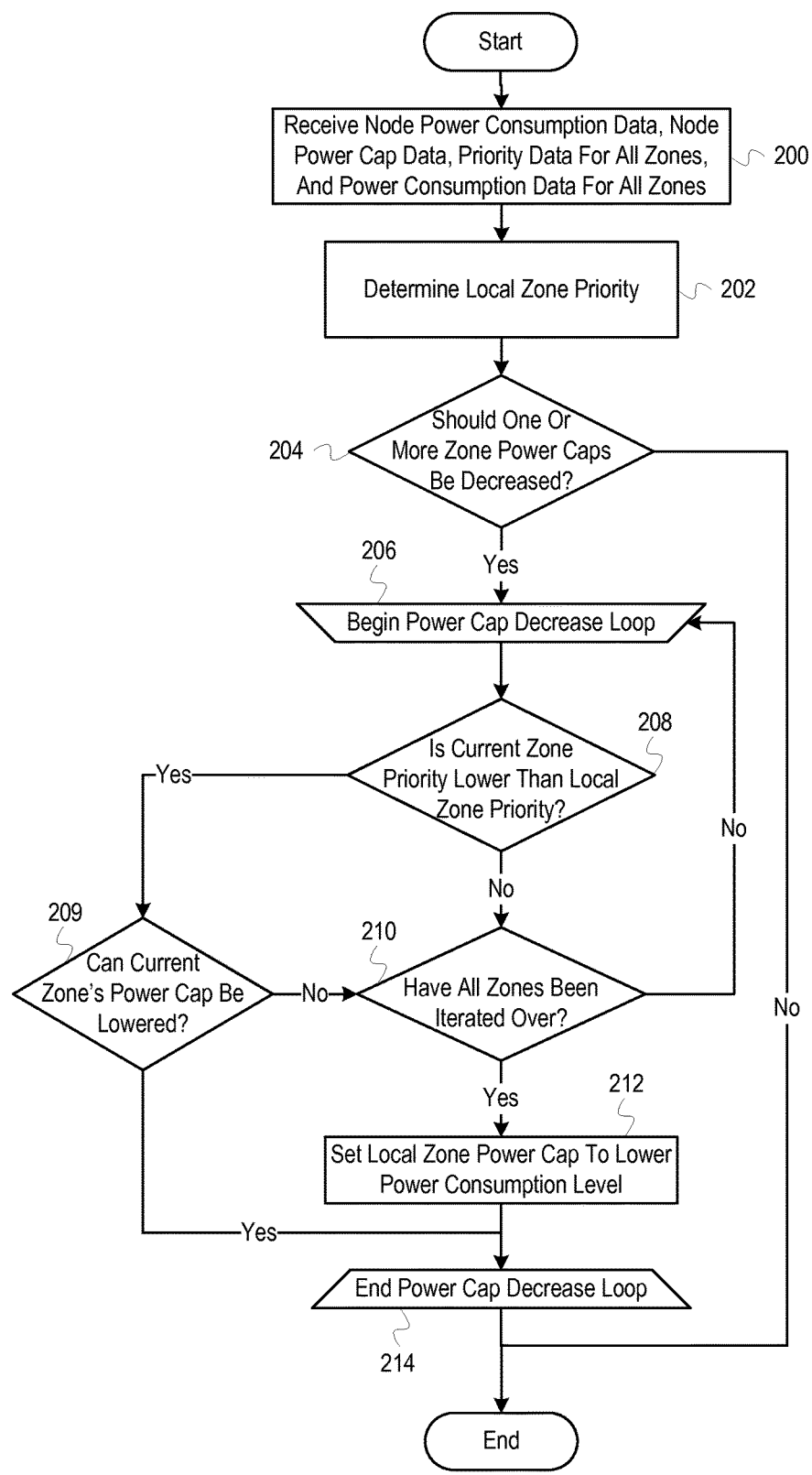
FIG. 2 depicts a flowchart of example operations for setting a zone power cap based on zone priorities.

FIG. 2 depicts a flowchart of example operations for setting a zone power cap based on zone priorities.

At block 200, a power cap analyzer receives the node power consumption data, the node power cap data, the priority data for all zones, and the zone power consumption data for all zones. As described above, the power cap analyzer can receive the data by reading the data from one or more components, such as a distributor or other zone controllers. Further, one or more other components can write the data to the power cap analyzer. The node power consumption data can be determined based on the zone power consumption data for all zones by summing the zone power consumption data. Thus, the power cap analyzer might not explicitly receive the node power consumption data, but rather calculate it from other received data. Similarly, the power cap analyzer might not receive the priority data explicitly, but might calculate the priority data from the data received, such as the zone power consumption data. Further, the power cap analyzer might only receive a subset of the data at any particular time. For example, instead of receiving all data at once, the power cap analyzer might only receive data that has changed. After the power cap analyzer receives the node power consumption data, the node power cap data, the priority data for all zones and the zone power consumption data for all zones, control then flows to block 202.

At block 202, the power cap analyzer determines the local zone priority. To determine the priority of the local zone (i.e., the zone containing the power cap analyzer), the power cap analyzer might read a value stored within the zone. For example, the zone might include a register that stores a value representing the zone priority. The zone priority might be stored in another component, such as a distributor component. Thus, the power cap analyzer might receive the local zone priority with the data received at block 200. If the zone priorities are calculated based on the data received, the power cap analyzer can determine the local zone priority in the same way as the priorities of the other zones are determined. After the power cap analyzer determines the local zone priority, control then flows to block 204.

At block 204, the power cap analyzer determines whether one or more zone power caps are to be decreased. As discussed above, in some instances the zone power caps are not modified in response to a change in the node power cap. For example, if the node power consumption is still below the node power cap, the zone power caps might not be decreased. Whether the zone power caps are to be decreased in a particular scenario can vary between implementations. However, one or more zone power caps will typically be decreased if the node power consumption is above the node power cap. If the power cap analyzer determines that one or more zone power caps are to be decreased, control then flows to block 206. If the power cap analyzer determines that no zone power caps are to be decreased, the process ends.

At block 206, a loop begins in which the power cap analyzer iterates through the data for each zone and determines whether a zone with a lower priority than the local zone can have its zone power cap lowered. A first zone is selected as the current zone during the first pass through block 206. On each additional pass through block 206, another zone becomes the current zone. Other data used to support the loop can be initialized and/or updated. After the loop is initialized or updated, control then flows to block 208.

At block 208, the power cap analyzer determines whether the current zone has a lower priority than the local zone. The priority of a zone can be represented in a variety of ways. For example, if there are two priorities (such as a low priority and a high priority), the priority can be represented by a single bit. Priorities can also be represented as scalar values, such as the integers zero through nine. Some implementations might define lower values as having lower priority than higher values while some implementations might define higher values as having lower priority than lower values. For example, if the integers zero through nine are used to define the priorities, zero can either be the lowest or the highest priority, depending on the implementation. The power cap analyzer can compare the local priority to the priority of the current zone. If the priority of the current zone is lower than the priority of the local zone, control then flows to block 209. If the priority of the current zone is not lower than the priority of the local zone, control then flows to block 210.

At block 209, the power cap analyzer determines whether the current zone's power cap can be lowered. As described above, a particular power cap level can be set as the minimum power cap for a zone. If the current zone's power cap is at the minimum zone power cap, the current zone's power cap cannot be lowered anymore. If the power cap analyzer determines that that current zone's power cap cannot be lowered, control then flows to block 210. If the power cap analyzer determines that the current zone's power cap can be lowered, control then flows to block 214.

Control flowed to block 210 if it was determined, at block 208, that the current zone priority is not lower than the local zone priority. Control also flowed to block 210 if it was determined, at block 209, that the current zone's power cap cannot be lowered. At block 210, the power cap analyzer determines whether all zones have been iterated over. In other words, the power cap analyzer determines whether all zones have been the current zone. If not all zones have been iterated over, control then flows back to block 206. If all zones have been iterated over, control then flows to block 212.

At block 212, the power cap analyzer sets the local zone's power cap to a lower power consumption level. As described above, the power cap analyzer can lower the local zone's power cap incrementally until the node power consumption is lower than the node power cap (or the local node's power cap is at the minimum power cap). In other words, the power cap analyzer can lower the local zone's power cap by a single increment until the process is run again. The power cap analyzer can also lower the local zone's power cap based on the amount needed to bring the node power consumption below the node power cap at once. In other words, the power cap analyzer can calculate the power level needed to bring the node power consumption below the node power cap and set the local zone's power cap to the calculated power level. If the calculated power level is below the minimum power cap, the power cap analyzer can set the local zone's power cap to the minimum power cap. After the power cap analyzer sets the local zone's power cap to a lower power consumption level, control then flows to block 214.

At block 214, the loop in which the power cap analyzer iterated over the zone data ends. At the end of the loop the power cap analyzer has either determined that there is one or more zones with a lower priority than the local zone that can also have their zone power cap lowered or lowered the local zone's power cap. After the loop in which the power cap analyzer iterated over the zone data ends, the process ends.

The operations for increasing the power caps in response to an increase in the node power cap using zone priorities are substantially similar to the operations depicted in FIG. 2. For example, block 208 would be modified to determine whether the current zone priority is higher than the local zone priority. Similarly, block 209 would be modified to determine if the current zone's power cap can be increased. Further, as described above, the various techniques used to adjust the zone power caps can vary between implementations. For example, the power caps may be lowered based on zone priorities while the power caps are increased proportionally based on their power consumption.

Figure 3:
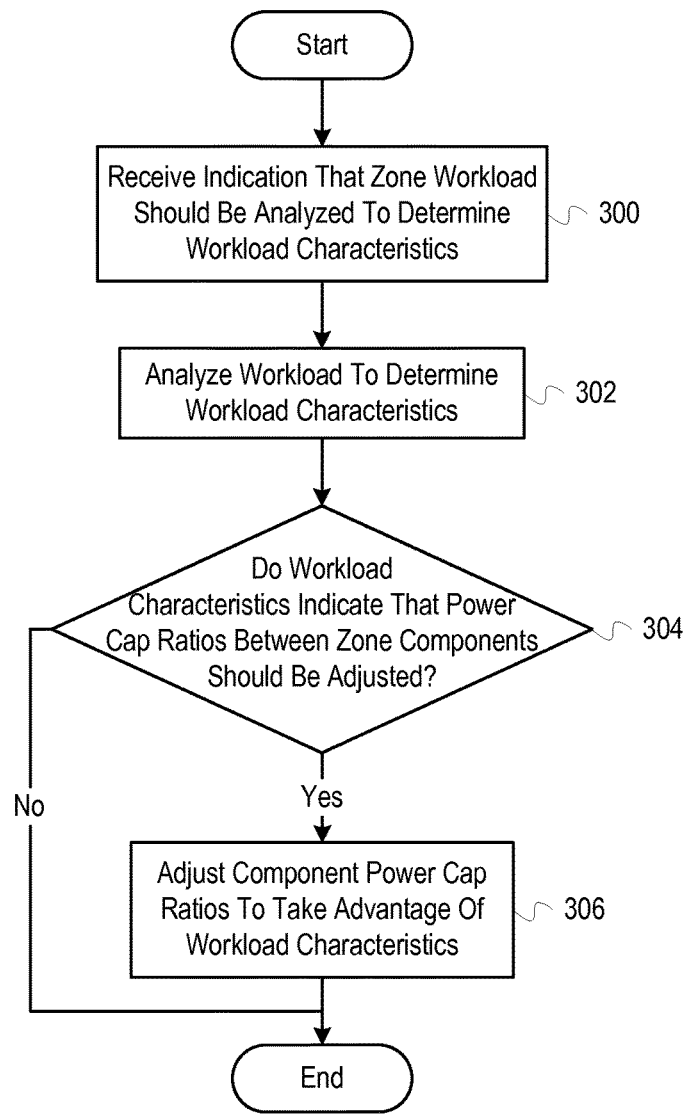
FIG. 3 depicts a flowchart of example operations for determining component power caps based on workload characteristics.

FIG. 3 depicts a flowchart of example operations for determining component power caps based on workload characteristics.

At block 300, a workload analyzer receives an indication that a zone workload should be analyzed to determine characteristics of the workload. The indication that the zone workload should be analyzed can take a variety of forms. For example, a component within the zone might notify the workload analyzer anytime the workload changes, such as when a processor component begins executing a different thread. The workload analyzer might receive an indication after a particular time interval, thus permitting the workload analyzer to run at regular intervals. The workload analyzer might receive an indication that the node or zone power cap has been updated. The specific indications that can trigger analysis by the workload analyzer can vary between implementations. After the workload analyzer receives the indication that the zone workload should be analyzed to determine characteristics of the workload, control then flows to block 302.

At block 302, the workload analyzer analyzes the workload to determine the workload characteristics. The analysis can vary between implementations. For example, the workload can be associated with metadata that indicates the workload characteristics. For example, each time a processor begins executing a thread, one or more registers can be written to with metadata pertaining to the thread. The metadata might indicate characteristics of the thread that are of interest to the workload analyzer, such as whether the workload is processor-intensive, memory-intensive, I/O-intensive, etc. Such metadata can be set by the analysis of one or more other components or set statically by a developer. The workload analyzer can analyze the operation of the workload by analyzing statistics maintained by one or more other components, as described above. The workload analyzer can also analyze how much power each component is using while the workload is executing. After the workload analyzer analyzes the workload to determine the workload characteristics, control then flows to block 304.

At block 304, the workload analyzer determines whether the workload characteristics indicate that the component power caps should be adjusted. Because the zone has a single power cap that is divided among the zone's components, the component power caps form a ratio. The power cap ratio between the zone's components can be adjusted to provide the component used most heavily by the workload with the greatest performance. For example, a zone can include a processor and memory used by the processor. If a workload is processor-intensive, the power cap can be divided between the processor and memory such that the component power cap ratio is weighted towards the processor. Thus, the processor would get a larger power cap relative to the memory power cap, allowing the processor to have increased performance. If the workload analyzer determines that the workload characteristics indicate that the component power caps should be adjusted, control then flows to block 306. If the workload analyzer determines that that the workload characteristics do not indicate that the component power caps should be adjusted, the process ends.

At block 306, the workload analyzer adjusts the component power cap ratio to take advantage of the workload characteristics. For example, if the workload analyzer determined that the workload is bound to a first component, the workload analyzer might increase the power cap of the first component and decrease the power cap of a second component. For example, assume that the zone includes a processor and memory used by the processor. Without analyzing the workload, the processor has a power cap of 170 watts and the memory has a power cap of 90 watts. The workload analyzer might subsequently determine that the workload is a memory-intensive workload. The workload analyzer might then change the processor power cap to 150 watts and increase the memory power cap to 110 watts. Thus, the memory is afforded additional power, hopefully ensuring higher performance of the workload relative to the original power caps. After the workload analyzer adjusts the component power cap ratio, the process ends.

In some implementations, the possible node power cap values might not align perfectly with the possible aggregate power consumption values. In other words, the total amount of power consumed by all power management zones (the aggregate power consumption) might not always equal the node power cap, even when each zone is using the maximum amount of power available. This can occur due to the finite size of adjustments that can be made to the components within the power management zones. In other words, the voltage and frequency of a processor is generally adjusted using a finite number of steps. Thus, for example, the voltage of a processor might be adjusted in $\frac{1}{10}^{th}$ volt steps, while the frequency might be adjusted in 250 megahertz steps. So, for example, it might be the case that the node power cap is 1000 watts, while the aggregate power consumption can only be 950 watts or 1050 watts. In such a scenario, a controller might set the zone power cap to a value that would result in an aggregate power consumption value of 950 watts (i.e., the maximum increment that is below the node power cap). Further, in some implementations, there may be some acceptable variation in actual power consumption that goes above the node power cap. For example, an aggregate power consumption of 1005 watts might be considered near enough to a node power cap of 1000 watts that no action is taken. Specific tolerances can vary between implementations.

As will be appreciated by one skilled in the art, aspects of the present inventive subject matter may be embodied as a system, method and/or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in a computer readable storage medium (or media) having computer readable program instructions embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
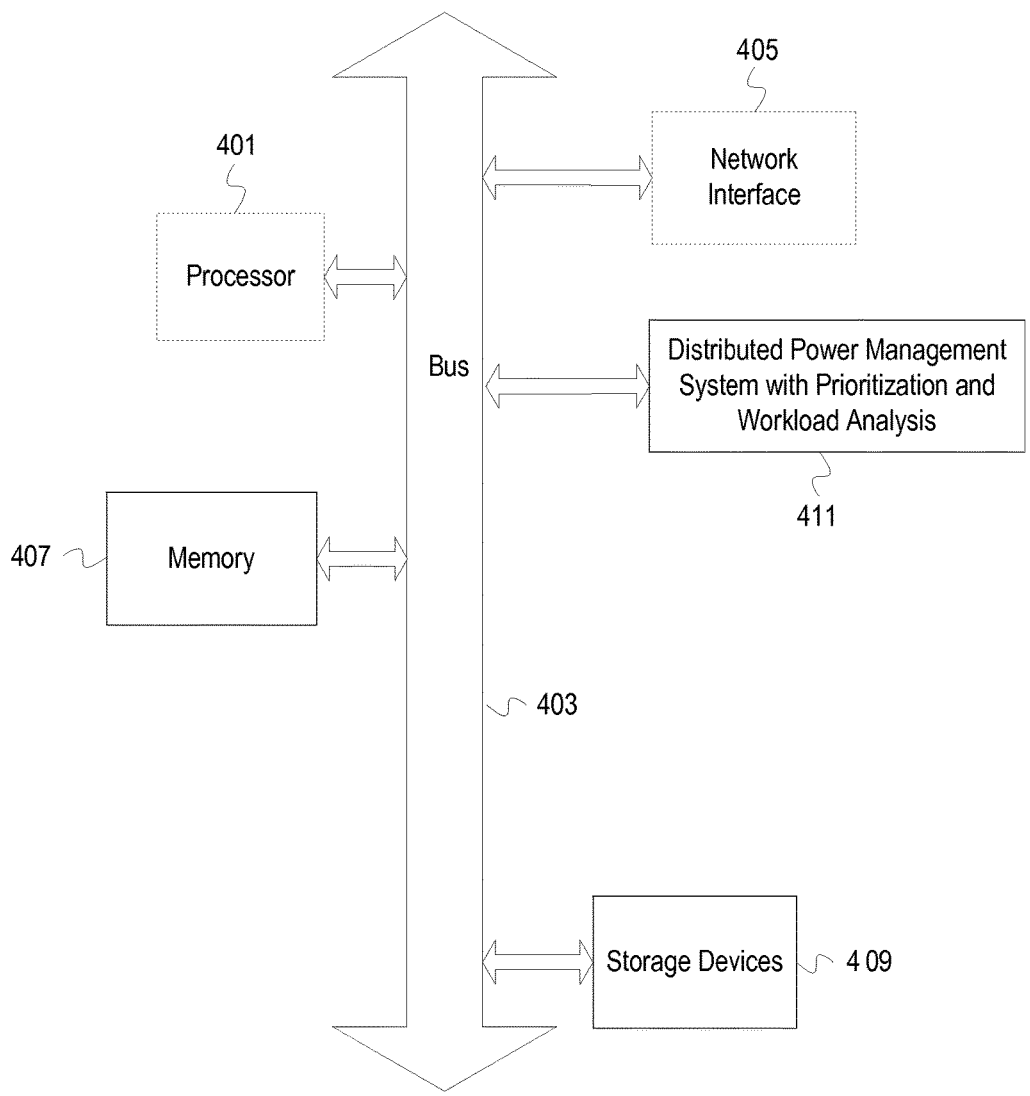
FIG. 4 depicts an example computing system.

FIG. 4 depicts an example computing system. A computing system 400 includes a processor 401 (possibly including multiple processors, multiple cores, multiple nodes, and/or implementing multi-threading, etc.). The computing system 400 includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable media. The computing system 400 also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computing system 400 also includes a distributed power management system with prioritization and workload analysis 411. The distributed power management system with prioritization and workload analysis 411 embodies functionality to implement embodiments described above. The distributed power management system with prioritization and workload analysis 411 may include one or more functionalities that facilitate determining power caps based on priority data and workload analysis. Any one of these functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401, the storage device(s) 409, and the network interface 405 are coupled to the bus 403. Although illustrated as being coupled to the bus 403, the memory 407 may be coupled to the processor 401.

While the embodiments are described with reference to various implementations and exploitations, it will be understood that these embodiments are illustrative and that the scope of the inventive subject matter is not limited to them. In general, techniques for distributed power management as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components.

These and other variations, modifications, additions, and improvements may fall within the scope of the inventive subject matter.

What is claimed is:

1. A method performed by a first power management controller of a plurality of power management controllers in a node, the method comprising:

receiving, from a distributor of the node, a current node power consumption for the node and a node power cap that defines a limit of power consumption for the node, the node power consumption based on power consumption data from the plurality of power management controllers, wherein the node comprises a plurality of components, each of the plurality of components associated with a respective one of the plurality of power management zones, wherein each of the plurality of power management zones is associated with a respective one of the plurality of power management controllers, and wherein the first power management controller is associated with only a first power management zone of the plurality of power management zones;

receiving, from the plurality of power management zones or from the distributor, priority data indicating a priority for each of the plurality of power management zones;

determining that the current node power consumption is greater than the node power cap; and in response to said determining that the current node power consumption is greater than the node power cap and until the current node power consumption is less than the node power cap, performing power reduction operations, wherein the power reduction operations comprise, determining that the first power management zone has a lowest priority among the plurality of power management zones based on the priority data and has a zone power cap greater than a minimum power cap for the first power management zone; and setting the zone power cap for the first power management zone to a value less than a prior value assigned as the zone power cap for the first power management zone.

2. The method of claim 1 further comprising:

determining that the node power cap has increased and that the power caps for the plurality of power management zones, in the aggregate, are less than the node power cap;

in response to said determining that the node power cap has increased and that the power caps for the plurality of power management zones, in the aggregate, is less than the node power cap, performing power cap increase operations until the power caps for the plurality of power management zones, in the aggregate, are equal to an aggregate power consumption value closest to the node power cap, wherein the power cap increase operations comprise, determining that the first power management zone has a highest priority among the plurality of power management zones and has a zone power cap less than a maximum power cap for the first power management zone; and setting the zone power cap for the first power management zone to a value greater than a prior value assigned as the zone power cap for the first power management zone.

3. The method of claim 1, wherein the power reduction operations further comprise assigning a component power cap to each of the plurality of components associated with the first power management zone based, at least in part, on the zone power cap for the first power management zone.

4. The method of claim 1, wherein the plurality of components comprises a processor and memory associated with the processor.

5. The method of claim 1, wherein said setting the zone power cap for the first power management zone to the value less than the prior value comprises overwriting an indication of a first performance state with an indication of a second performance state, wherein the second performance state is associated with lower power consumption than the first performance state.

6. The method of claim 1, wherein the power reduction operations further comprise assigning a priority to the first power management zone based, at least in part, on an amount of power consumed by the first power management zone with respect to the zone power cap of the first power management zone.

7. The method of claim 1 further comprising receiving at least one of the node power consumption, node power cap, and power consumption data for each of the plurality of power management zones.

* * * * *